United States Patent
Kao et al.

(10) Patent No.: US 12,498,333 B2
(45) Date of Patent: Dec. 16, 2025

(54) DEFECT OFFSET CORRECTION FOR EXAMINATION OF SEMICONDUCTOR SPECIMENS

(71) Applicant: Applied Materials Israel Ltd., Rehovot (IL)

(72) Inventors: Albert Kao, Taipei (TW); Shih-Wei Yang, Hsinchu (TW); Chun-Hsiang Yen, Hsinchu (TW); Boaz Cohen, Lehavim (IL); Yen Cheng Chiang, Hukou Township, Hsinchu County (TW); Ching-Hung Lai, Hsinchu (TW); Chenwei Huang, Hsinchu (TW)

(73) Assignee: Applied Materials Israel Ltd., Rehovot (IL)

( * ) Notice: Subject to any disclaimer, the term of this patent is extended or adjusted under 35 U.S.C. 154(b) by 45 days.

(21) Appl. No.: 18/407,275

(22) Filed: Jan. 8, 2024

(65) Prior Publication Data

US 2025/0224343 A1 Jul. 10, 2025

(51) Int. Cl.
*G01N 21/95* (2006.01)
(52) U.S. Cl.
CPC ................................ *G01N 21/9501* (2013.01)
(58) Field of Classification Search
CPC .................................................. G01N 21/9501
See application file for complete search history.

(56) References Cited

U.S. PATENT DOCUMENTS

| 7,904,845 | B2 | 3/2011 | Fouquet | |
|---|---|---|---|---|
| 10,354,405 | B2 | 7/2019 | Lee | |
| 11,430,108 | B2 * | 8/2022 | Liao | G06T 7/001 |
| 2024/0078659 | A1 * | 3/2024 | Ofir | G06T 7/001 |
| 2025/0200741 | A1 * | 6/2025 | Kaminsky | G06T 7/001 |

* cited by examiner

*Primary Examiner* — Tony Ko
(74) *Attorney, Agent, or Firm* — Lowenstein Sander LLP

(57) ABSTRACT

There is provided a system and method of examination of a semiconductor specimen. The method includes obtaining a group of defect candidates associated with respective inspection locations represented in an inspection coordinate system; using a trained machine learning (ML) model to provide, for each defect candidate, a probability of the defect candidate being a defect of interest (DOI), and ranking the group of defect candidates to an ordered list according to respective probabilities thereof, in response to a part of the ordered list of defect candidates being reviewed by a review tool in accordance with an order thereof, receiving a predefined number of DOIs associated with respective review locations represented in a review coordinate system; and calculating an offset between the review coordinate system and the inspection coordinate system based on respective inspection and review locations associated with the predefined number of DOIs.

20 Claims, 7 Drawing Sheets

| TPT breakdown | Layer1 | Layer2 | Layer3 | Layer4 |
|---|---|---|---|---|
| Motion | 53% | 69% | 58% | 60% |
| Image Grab time | 47% | 17% | 20% | 27% |
| AF | 0% | 0% | 11% | 13% |
| ADR | 0% | 0% | 12% | 0% |
| DPH improvement | 23.5% | 8.5% | 10.0% | 13.5% |

FIG. 10

DEFECT OFFSET CORRECTION FOR EXAMINATION OF SEMICONDUCTOR SPECIMENS

TECHNICAL FIELD

The presently disclosed subject matter relates, in general, to the field of examination of a semiconductor specimen, and more specifically, to location correction for defects on a specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally, or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc.

Automated examination systems ensure that the parts manufactured meet the quality standards expected and provide useful information on adjustments that may be needed to the manufacturing tools, equipment, and/or compositions, depending on the type of defects identified. In some cases, machine learning technologies can be used to assist the automated examination process so as to promote higher yield.

SUMMARY

In accordance with certain aspects of the presently disclosed subject matter, there is provided a computerized system of examining a semiconductor specimen, the system comprising a processing circuitry configured to obtain a group of defect candidates from a defect map resulting from inspecting the specimen by an inspection tool, the group of defect candidates associated with respective inspection locations represented in an inspection coordinate system; use a trained machine learning (ML) model to provide, for each defect candidate in the group, a probability of the defect candidate being a defect of interest (DOI), and rank the group of defect candidates to an ordered list of defect candidates according to respective probabilities thereof, in response to a part of the ordered list of defect candidates being reviewed by a review tool in accordance with an order thereof, receive, from the review tool, a predefined number of DOIs identified from the part of the ordered list and associated with respective review locations represented in a review coordinate system; and calculate an offset between the review coordinate system and the inspection coordinate system based on respective inspection and review locations associated with the predefined number of DOIs, wherein the offset is usable by the review tool to review at least part of the group of defect candidates which is not yet reviewed.

In addition to the above features, the system according to this aspect of the presently disclosed subject matter can comprise one or more of features (i) to (xii) listed below, in any desired combination or permutation which is technically possible:

(i) The ML model can be previously trained using a training set of defect candidates, each defect candidate characterized by one or more inspection attributes and associated with a respective ground truth (GT) label indicative of the defect candidate being a DOI or nuisance.

(ii) The one or more inspection attributes characterizing each defect candidate can comprise at least one of: grade, volume, polarity, strength, size, and probability of the defect candidate being a DOI.

(iii) The training of the ML model can comprise: for each given defect candidate in the training set, processing the given defect candidate by the ML model, to obtain a predicted class thereof, and optimizing the ML model using a loss function based on the predicted class and the GT label associated with the given defect candidate.

(iv) The loss function can be configured based on selection purity representative of a percentage of the number of actual DOIs within the number of defect candidates identified as DOIs.

(v) Only defect candidates in the training set that are DOIs and have a relatively high level of relevance to be used for offset correction can be labeled as DOIs.

(vi) The offset can be represented by a transformation matrix comprising a plurality of transformation coefficients corresponding to a plurality of degrees of freedom of transformation between the inspection coordinate system and the review coordinate system.

(vii) The plurality of transformation coefficients can comprise two or more of: X offset, Y offset, rotation, perpendicularity, X scaling, and Y scaling, x parabolic, and y parabolic.

(viii) The predefined number of DOIs as selected can be associated with the number of transformation coefficients in the transformation matrix.

(ix) The offset can be calculated by performing linear regression based on the respective inspection and review locations associated with the predefined number of DOIs.

(x) The processing circuitry can be further configured to obtain review locations for the at least part of the group of defect candidates which is not yet reviewed using the offset, thereby enabling the review tool to review the at least part of the group of defect candidates at the review locations.

(xi) The reviewing of the at least part of the group of defect candidates which is not yet reviewed using the offset enables to improve throughput (TpT) of the review tool.

(xii) The ML model is implemented as one of a random forest, a logistic regression model, or a neural network.

In accordance with other aspects of the presently disclosed subject matter, there is provided a computerized method of examining a semiconductor specimen, the method comprising: obtaining a group of defect candidates from a defect map resulting from inspecting the semiconductor specimen by an inspection tool, the group of defect candidates associated with respective inspection locations represented in an inspection coordinate system; using a trained machine learning (ML) model to provide, for each defect candidate in the group, a probability of the defect candidate being a defect of interest (DOI), and ranking the group of defect candidates to an ordered list of defect candidates according to respective probabilities thereof, in response to a part of the ordered list of defect candidates being reviewed by a review tool in accordance with an order thereof, receiving, from the review tool, a predefined number of DOIs identified from the part of the ordered list and associated with respective review locations represented in a review coordinate system; and calculating an offset between the review coordinate system and the inspection coordinate system based on respective inspection and review locations associated with the predefined number of DOIs, wherein the offset is usable by the review tool to review at least part of the group of defect candidates which is not yet reviewed.

These aspects of the disclosed subject matter can comprise one or more of features (i) to (xii) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of examining a semiconductor specimen, the method comprising: obtaining a group of defect candidates from a defect map resulting from inspecting the semiconductor specimen by an inspection tool, the group of defect candidates associated with respective inspection locations represented in an inspection coordinate system; using a trained machine learning (ML) model to provide, for each defect candidate in the group, a probability of the defect candidate being a defect of interest (DOI), and ranking the group of defect candidates to an ordered list of defect candidates according to respective probabilities thereof, in response to a part of the ordered list of defect candidates being reviewed by a review tool in accordance with an order thereof, receiving, from the review tool, a predefined number of DOIs identified from the part of the ordered list and associated with respective review locations represented in a review coordinate system; and calculating an offset between the review coordinate system and the inspection coordinate system based on respective inspection and review locations associated with the predefined number of DOIs, wherein the offset is usable by the review tool to review at least part of the group of defect candidates which is not yet reviewed.

This aspect of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 10 illustrates an example of throughput (TpT) improvement for examining a specimen in accordance with certain embodiments of the presently disclosed subject matter.

DETAILED DESCRIPTION OF EMBODIMENTS

Figure 1:
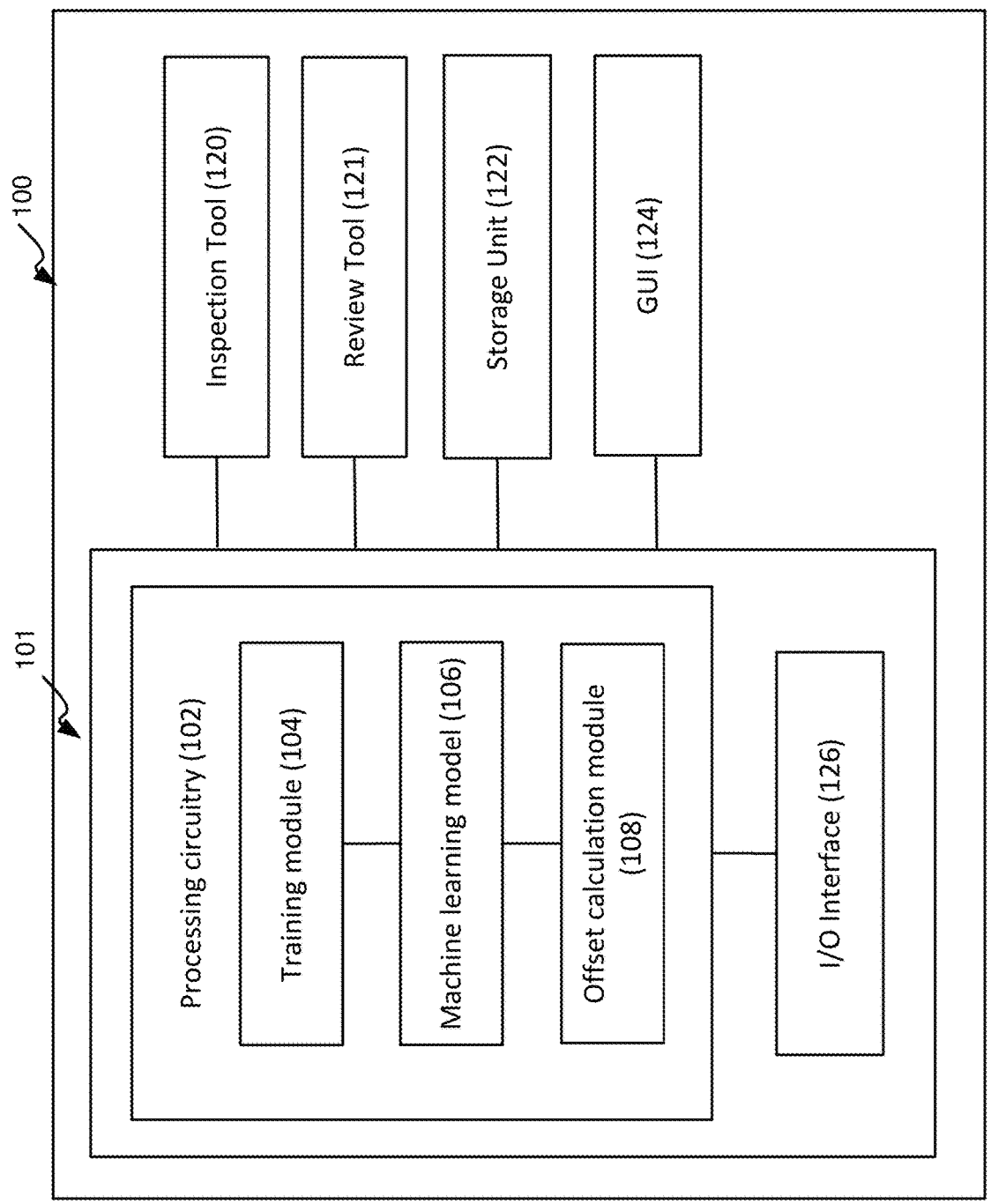
FIG. 1 illustrates a generalized block diagram of an examination system in accordance with certain embodiments of the presently disclosed subject matter.

The process of semiconductor manufacturing often requires multiple sequential processing steps and/or layers, some of which could possibly cause errors that may lead to yield loss. Examples of various processing steps can include lithography, etching, depositing, planarization, growth (such as, e.g., epitaxial growth), and implantation, etc. Various examination operations, such as defect-related examination (e.g., defect detection, defect review, and defect classification, etc.), and/or metrology-related examination (e.g., critical dimension (CD) measurements, etc.), can be performed at different processing steps/layers during the manufacturing process to monitor and control the process. The examination operations can be performed a multiplicity of times, for example after certain processing steps, and/or after the manufacturing of certain layers, or the like.

Defect-related examination can generally employ a two-phase procedure, e.g., inspection of a specimen, followed by review of sampled locations of potential defects. During the first phase, the surface of a specimen is inspected by an inspection tool at relatively higher speed and lower resolution. Defect detection is typically performed by applying a defect detection algorithm to the inspection output. Various detection algorithms can be used for detecting defects on specimens, such as Die-to-Die (D2D), Die-to-History (D2H), Die-to-Database (D2DB), Cell-to-Cell (C2C), etc. By way of example, in D2D, an inspection image of a target die is captured, and one or more reference images are captured from one or more reference dies (e.g., one or more neighboring dies) of the target die. The inspection image and the reference images are aligned and compared to each other. One or more difference images (and/or derivatives thereof, such as grade images) can be generated based on the difference between pixel values of the inspection image, and pixel values derived from the one or more reference images. A detection threshold is then applied to the difference maps, and a defect map is produced to show suspected locations on the target die having a high probability of being a true defect (also referred to as a defect of interest (DOI)).

During the second phase, at least some of the suspected locations on the defect map are more thoroughly analyzed by a review tool with relatively higher resolution, for ascertaining whether a defect candidate is indeed a DOI, and/or determining different parameters of the DOIs, such as classes, thickness, roughness, size, and so on.

When sending the defect candidates identified by the inspection tool to the review tool to be reviewed, oftentimes the defect candidates would not be observed by the review tool at presumed locations as indicated by the defect map. This is mainly due to the fact that the inspection tool and review tool are different examination machines, which in some cases may be produced by different companies. Such two tools naturally have different coordinate systems, which causes the inspection coordinates representing locations of defect candidates in a defect map to be not automatically usable by the review tool without being corrected/adjusted. Typically, when the review tool acquires a review image at a location of a defect candidate as prescribed by the defect map, it is quite common that the review image would not capture the defect candidate at the exact location due to such mismatch between two different coordinate systems.

Figure 4:
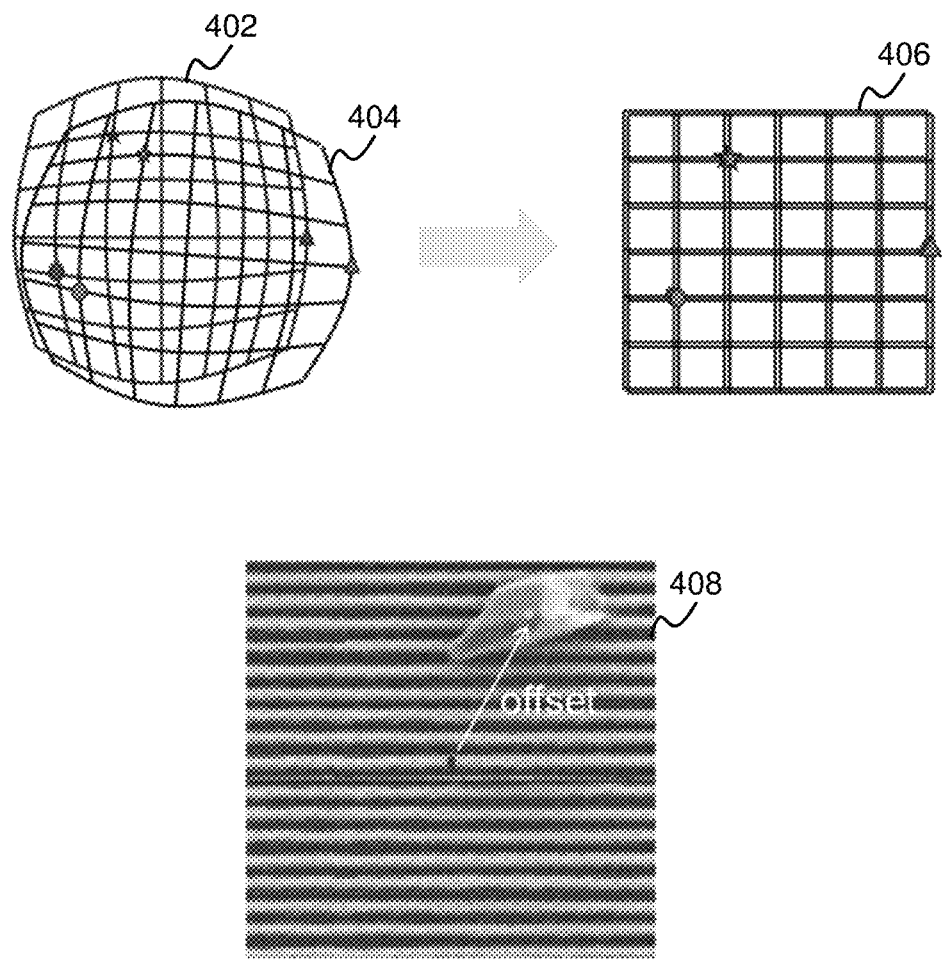
FIG. 4 shows a schematic illustration of two different coordinate systems and an example of a defect offset in accordance with certain embodiments of the presently disclosed subject matter.

FIG. 4 shows a schematic illustration of two different coordinate systems and an example of a defect offset in accordance with certain embodiments of the presently disclosed subject matter.

The coordinate system 402 is exemplified as the inspection coordinate system of an inspection tool (such as, e.g., an optical tool), while the coordinate system 404 is exemplified as the review coordinate system of a review tool (such as, e.g., SEM). As shown, there is a mismatch between the two coordinate systems, in one or more degrees of freedom of transformation between the two systems, such as, e.g., X offset, Y offset, rotation, perpendicularity, X scaling, Y scaling, X parabolic, and Y parabolic, etc. Due to such mismatch, the inspection locations of the defects in the inspection coordinate system 402 are not aligned with the review locations of the same defects in the review coordinate system 404 (three defect examples are marked respectively by circle, star, and triangle in FIG. 4). The review locations are typically shifted with an offset from the inspection locations.

Therefore, to ensure that the defect candidate is captured, the review tool needs to be configured with an enlarged field of view (FOV) in order to guarantee the defect candidate is within the FOV. As illustrated in 408, when a review tool navigates according to an inspection location, i.e., centering the FOV by the inspection location, the actual location of the defect may deviate from the center with an offset. In the present example, the defect appears with an offset to the upper right corner of the FOV. Therefore, the FOV of the review tool should be enlarged to an extent to make sure the shifted defect will be captured. As the review tool is typically scanning the specimen with a relatively lower speed and higher resolution, enlargement of the FOV would inevitably cause long image grab time, thus negatively affecting the throughput (TpT) of the system.

In some cases, other than increasing the size of FOV, it is possible to manually align the coordinates between the inspection tool and the review tool, which is referred to as Manual Defect Offset (MDO) correction. The conventional MDO process includes a repetitive process of visiting the defect candidates in the defect map one by one, and verifying each candidate with the review tool in order to locate qualifying defects for alignment (which are also referred to as "anchoring" defects). Since the defect map typically contains a large number of defect candidates most of which are in fact false alarms, such repeated trial and error of manual defect selection for locating anchoring defects is tedious and time consuming.

Certain efforts have been invested in an attempt to establish automatic offset correction between different tools, such as, e.g., reference-based offset correction. In such cases, a reference feature on a wafer is used to identify an offset between the tools, which can be then applied to the defect candidates on the defect map. For purpose of having a unique pattern as the reference feature for registration, in some cases a dummy pattern needs to be designed and manufactured on the physical wafer, such as in the scribe region. Such physical changes of the wafer unavoidably affect the flexibility of integrated circuit (IC) design, increase the process complication, and may even impact yield. In addition, reference-based correction approaches do not provide a direct measurement of defect coordinate discrepancy (but rather via reference coordinate offset), thus cannot always ensure the level of measurement accuracy.

As semiconductor fabrication processes continue to advance, semiconductor devices are developed with increasingly complex structures with shrinking feature dimensions, which has increased the sensitivity of semiconductor processing to defect offsets, thus making it even more critical to correct the misalignment between different examination tools, match the coordinates between different coordinate systems (such as aligning the inspection coordinate system 402 and review coordinate system 404 to be as illustrated in 406) to provide satisfying examination performance.

Accordingly, certain embodiments of the presently disclosed subject matter propose an automatic defect offset correction system, which does not have one or more of the disadvantages described above. The present disclosure proposes to only sample a small number of defect candidates in order to identify anchoring defects which can be used to establish more accurate location of all defect candidates. The present disclosure provides an automated system configured to correct defect offsets in an automated manner, without requiring manual intervention or suffering from repeated trial and error of defect selection to locate qualifying defects for alignment, thereby enhancing the review efficiency significantly, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect review, defect classification, nuisance filtration, segmentation, and/or metrology operations, etc., with respect to the specimen. System 100 comprises one or more examination tools configured to scan a specimen and capture images thereof to be further processed for various examination applications.

The term "examination tool(s)" used herein should be expansively construed to cover any tools that can be used in examination-related processes, including, by way of non-limiting example, scanning (in a single or in multiple scans), imaging, sampling, reviewing, measuring, classifying, and/or other processes provided with regard to the specimen or parts thereof. Without limiting the scope of the disclosure in any way, it should also be noted that the examination tools can be implemented as inspection machines of various types, such as optical inspection machines, electron beam inspection machines (e.g., a Scanning Electron Microscope (SEM), an Atomic Force Microscopy (AFM), or a Transmission Electron Microscope (TEM), etc.), and so on.

The one or more examination tools can include one or more inspection tools 120 and one or more review tools 121. In some cases, an inspection tool 120 can be configured to scan a specimen (e.g., an entire wafer, an entire die, or portions thereof) to capture inspection images (typically, at a relatively high-speed and/or low-resolution) for detection of potential defects (i.e., defect candidates). During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another, to build up, swath-at-a-time, an image of the surface of the wafer. For instance, the tool can scan a wafer along a swath from up to down, then switch to the next swath and scan it from down to up, and so on and so forth, until the entire wafer is scanned and inspection images of the wafer are collected.

In some cases, a review tool 121 can be configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). By way of example, the review tool can be an electron beam tool, such as, e.g., a scanning electron microscope (SEM), etc. An SEM is a type of electron microscope that produces images of a specimen by scanning the specimen with a focused beam of electrons. The electrons interact with atoms in the specimen, producing various signals that contain information on the surface topography and/or composition of the specimen. An SEM is capable of accurately inspecting and measuring features during the manufacture of semiconductor wafers.

The inspection tool 120 and review tool 121 can be different tools located at the same or at different locations, or a single tool operated in two different modes. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools. In some cases, at least one of the examination tools has metrology capabilities and can be configured to capture images and perform metrology operations on the captured images. Such an examination tool is also referred to as a metrology tool.

According to certain embodiments of the presently disclosed subject matter, the examination system 100 comprises a computer-based system 101 operatively connected to the inspection tool 120 and the review tool 121, and capable of automatic defect offset correction between the inspection tool and the review tool. System 101 is also referred to as defect offset correction system.

System 101 includes a processing circuitry 102 operatively connected to a hardware-based I/O interface 126 and configured to provide processing necessary for operating the system, as further detailed with reference to FIGS. 2-3. The processing circuitry 102 can comprise one or more processors (not shown separately) and one or more memories (not shown separately). The one or more processors of the processing circuitry 102 can be configured to, either separately or in any appropriate combination, execute several functional modules in accordance with computer-readable instructions implemented on a non-transitory computer-readable memory comprised in the processing circuitry. Such functional modules are referred to hereinafter as comprised in the processing circuitry.

The one or more processors referred to herein can represent one or more general-purpose processing devices such as a microprocessor, a central processing unit, or the like. More particularly, a given processor may be one of a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

According to certain embodiments, one or more functional modules comprised in the processing circuitry 102 of system 101 can include a machine learning (ML) module 106 that was previously trained during a training/setup phase and an offset calculation module 108 operatively connected to each other.

Specifically, the processing circuitry 102 can be configured to obtain, via an I/O interface 126, obtain a group of defect candidates from a defect map resulting from inspecting the specimen by an inspection tool. The group of defect candidates is associated with respective inspection locations represented in an inspection coordinate system. The trained ML model 106 can be used to provide, for each defect candidate in the group, a probability of the defect candidate being a defect of interest (DOI), and rank the group of defect candidates to an ordered list of defect candidates according to respective probabilities thereof.

The ordered list of defect candidates can be sent to the review tool 121. At least a part of the ordered list of defect candidates can be reviewed by the review tool 121 in accordance with an order thereof, so as to identify a predefined number of DOIs associated with respective review locations represented in a review coordinate system. Upon receiving, from the review tool, the predefined number of DOIs identified from the part of the ordered list and associated with respective review locations represented in a review coordinate system, the offset calculation module 108 can be configured to calculate an offset between the review coordinate system and the inspection coordinate system based on respective inspection and review locations associated with the predefined number of DOIs. The offset is usable by the review tool to review at least part of the group of defect candidates which is not yet reviewed.

In some cases, the ML model 106 and the offset calculation module 108 can be regarded as part of a defect examination recipe usable for performing runtime defect examination operations, in particular defect review operations, on acquired runtime images of defect candidates.

In some cases, system 101 can be configured as a training system capable of training the ML model during a training/setup phase using a specific training set. In such cases, one or more functional modules comprised in the processing circuitry 102 of system 101 can include a training module 104 and a ML model 106 to be trained. Specifically, the training module 104 can be configured to obtain a training set, and use the training set to train the ML model, as will be detailed below with reference to FIG. 3. As described above, the ML model 106, upon being trained, is usable to rank the group of defect candidates in runtime to an ordered list of defect candidates according to respective probabilities thereof.

According to certain embodiments, the ML model 106 can be implemented as various types of machine learning models. By way of example, the ML model can be implemented as one of the following: various decision trees, regression models, neural networks, transformers, and/or ensembles/combinations thereof. The learning algorithms used by the ML models can be any of the following: supervised learning, unsupervised learning, self-supervised, semi-supervised learning, or a combination thereof, etc. The presently disclosed subject matter is not limited to the specific types of the ML model or the specific types of learning algorithms used by the ML model.

By way of example, in some cases, the ML model can be implemented as a deep neural network (DNN). DNN can comprise multiple layers organized in accordance with respective DNN architecture. By way of non-limiting example, the layers of DNN can be organized in accordance with architecture of a Convolutional Neural Network (CNN), Recurrent Neural Network, Recursive Neural Networks, autoencoder, Generative Adversarial Network (GAN), or otherwise. Optionally, at least some of the layers can be organized into a plurality of DNN sub-networks. Each layer of DNN can include multiple basic computational elements (CE) typically referred to in the art as dimensions, neurons, or nodes.

The weighting and/or threshold values associated with the CEs of a DNN and the connections thereof can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a DNN is referred to as a training set.

It is noted that the teachings of the presently disclosed subject matter are not bound by specific architecture of the ML models as described above.

It is to be noted that while certain embodiments of the present disclosure refer to the processing circuitry 102 being configured to perform the above recited operations, the functionalities/operations of the aforementioned functional modules can be performed by the one or more processors in processing circuitry 102 in various ways. By way of example, the operations of each functional module can be performed by a specific processor, or by a combination of processors. The operations of the various functional modules, such as ML model processing, and offset calculation, etc., can thus be performed by respective processors (or processor combinations) in the processing circuitry 102, while, optionally, these operations may be performed by the same processor. The present disclosure should not be limited to being construed as one single processor always performing all the operations.

In some cases, additionally to system 101, the examination system 100 can comprise one or more examination modules, such as, e.g., defect detection module, nuisance filtration module, Automatic Defect Review Module (ADR), Automatic Defect Classification Module (ADC), metrology operation module, and/or other examination modules which are usable for examination of a semiconductor specimen. The one or more examination modules can be implemented as stand-alone computers, or their functionalities (or at least part thereof) can be integrated with the examination tools 120 and 121. In some cases, the output of system 101, e.g., the calculated offset, the ordered list of defect candidates, and/or further defect review result, can be provided to the one or more examination modules (such as the ADR, ADC, etc.) for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the defect map, the inspection and review images of defect candidates, the training set, as described above. Accordingly, the different types of input data as required can be retrieved from the storage unit 122 and provided to the processing circuitry 102 for further processing. The output of the system 101, such as, e.g., the calculated offset, the ordered list of defect candidates, and/or further defect review result, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, the defect map, etc. The user may be provided, through the GUI, with options of defining certain operation parameters, such as, e.g., the target number of DOIs needed as anchoring defects, the number of degrees of freedom for transformation between the inspection coordinate system and the review coordinate system, etc. The user may also view the operation results or intermediate processing results, such as, e.g., the calculated offset, the ordered list of defect candidates, and/or further defect review result, etc., on the GUI.

In some cases, system 101 can be further configured to send, via I/O interface 126, the operation results to the examination tools 120 and 121 for further processing. In some cases, system 101 can be further configured to send the results to the storage unit 122, and/or external systems (e.g., Yield Management System (YMS) of a fabrication plant (fab)). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1. Each system component and module in FIG. 1 can be made up of any combination of software, hardware, and/or firmware, as relevant, executed on a suitable device or devices, which perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules, and functions than those shown in FIG. 1.

Each component in FIG. 1 may represent a plurality of the particular components, which are adapted to independently and/or cooperatively operate to process various data and electrical inputs, and for enabling operations related to a computerized examination system. In some cases, multiple instances of a component may be utilized for reasons of performance, redundancy, and/or availability. Similarly, in some cases, multiple instances of a component may be utilized for reasons of functionality or application. For example, different portions of the particular functionality may be placed in different instances of the component.

It should be noted that the examination system illustrated in FIG. 1 can be implemented in a distributed computing environment, in which one or more of the aforementioned components and functional modules shown in FIG. 1 can be distributed over several local and/or remote devices. By way of example, the examination tools 120 and 121, and the system 101 can be located at the same entity (in some cases hosted by the same device) or distributed over different entities. By way of another example, as described above, in some cases, system 101 can be configured as a training system for training the ML model, while in some other cases, system 101 can be configured as a runtime defect offset correction system using the trained ML model. The training system and the runtime offset correction system can be located at the same entity (in some cases hosted by the same device), or distributed over different entities, depending on specific system configurations and implementation needs.

In some examples, certain components utilize a cloud implementation, e.g., are implemented in a private or public cloud. Communication between the various components of the examination system, in cases where they are not located entirely in one location or in one physical entity, can be realized by any signaling system or communication components, modules, protocols, software languages, and drive signals, and can be wired and/or wireless, as appropriate.

It should be further noted that in some embodiments at least some of examination tools 120 and 121, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120 and 121, thereby facilitating and enhancing the functionalities of the examination tools in examination-related processes.

Figure 2:
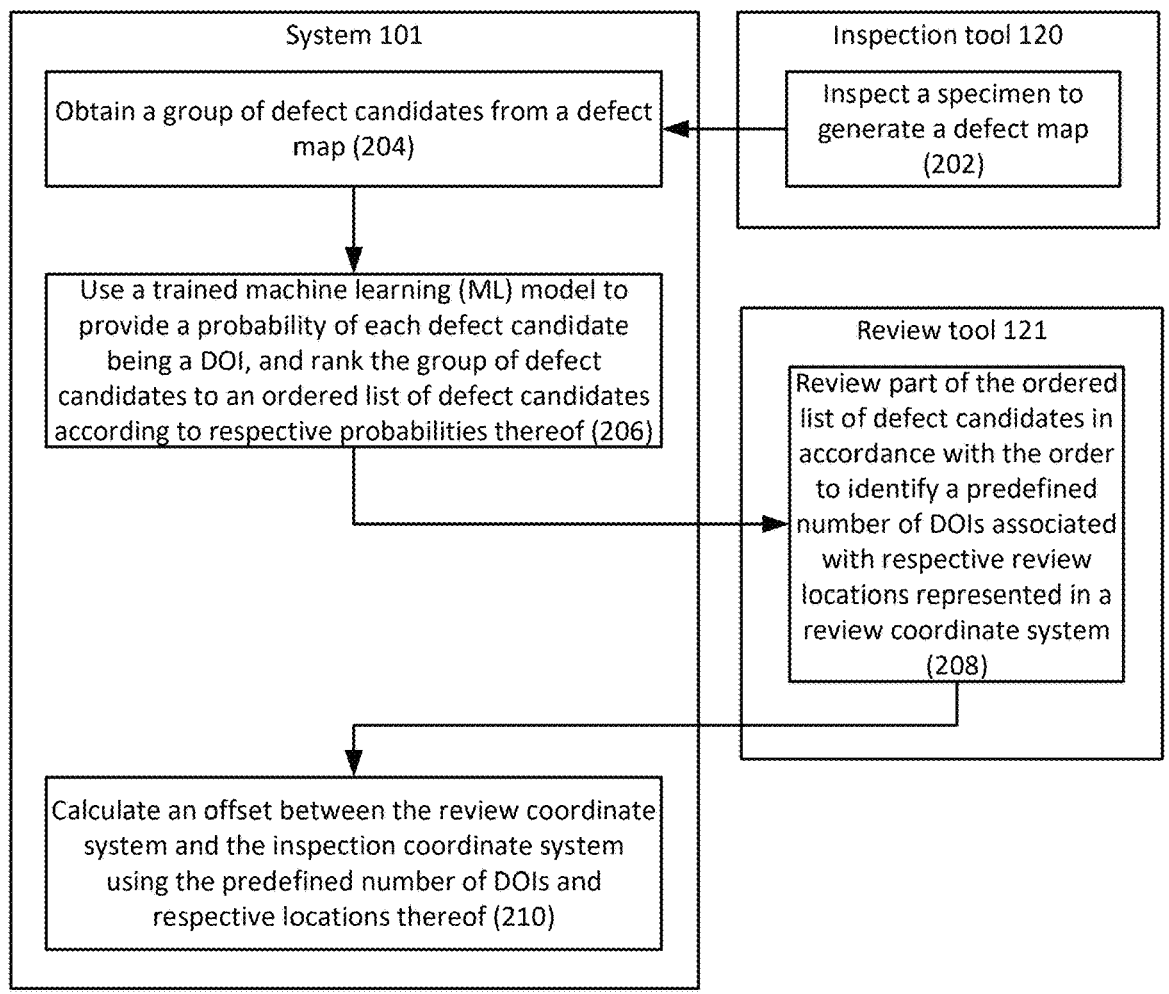
FIG. 2 illustrates a generalized flowchart of automatic defect offset correction between an inspection tool and a review tool in accordance with certain embodiments of the presently disclosed subject matter.
Figure 3:
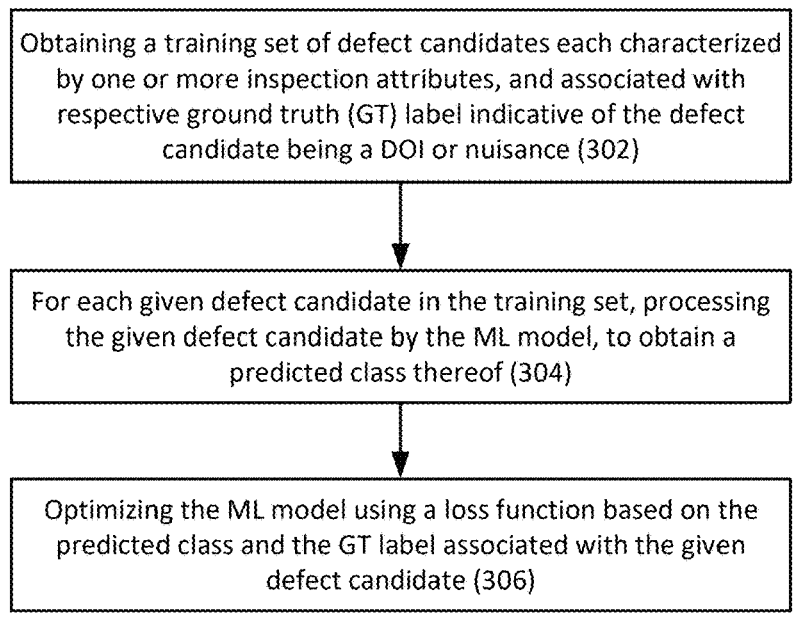
FIG. 3 illustrates a generalized flowchart of training the ML model in accordance with certain embodiments of the presently disclosed subject matter.

While not necessarily so, the process of operations of systems 101 and 100 can correspond to some or all of the stages of the methods described with respect to FIGS. 2-3. Likewise, the methods described with respect to FIGS. 2-3 and their possible implementations can be implemented by systems 101 and 100. It is therefore noted that embodiments discussed in relation to the methods described with respect to FIGS. 2-3 can also be implemented, mutatis mutandis as various embodiments of the systems 101 and 100, and vice versa.

Referring to FIG. 2, there is illustrated a generalized flowchart of automatic defect offset correction between an inspection tool and a review tool in accordance with certain embodiments of the presently disclosed subject matter.

As described above, a semiconductor specimen is typically made of multiple layers. The examination process of a specimen can be performed a multiplicity of times during the fabrication process of the specimen, for example following the processing steps of specific layers. In some cases, a sampled set of processing steps can be selected for in-line examination, based on their known impacts on device characteristics or yield. Images of the specimen or parts thereof can be acquired at the sampled set of processing steps to be examined.

For the purpose of illustration only, certain embodiments of the following description are described with respect to images of a given processing step/layer of the sampled set of processing steps. Those skilled in the art will readily appreciate that the teachings of the presently disclosed subject matter, such as the process of automatic defect offset correction described below, can be performed following any layer and/or processing steps of the specimen. The present disclosure should not be limited to the number of layers comprised in the specimen and/or the specific layer(s) to be examined.

A defect map can be generated (202), resulting from inspecting a semiconductor specimen by an inspection tool (e.g., by the inspection tool 120). The defect map is indicative of defect candidate distribution on the specimen (e.g., suspected defects of being defects of interest (DOIs), with their respective inspection locations on the specimen). Specifically, the defect map may typically contain a large number of defect candidates, which in some cases can be in the magnitude of tens of thousands to millions. In addition to the inspection locations, the defect map can be informative of one or more inspection attributes associated with each given defect candidate and representative of defect characteristics of the given defect candidate, such as, e.g., strength, size, grade, volume, and polarity, etc.

A group of defect candidates from the defect map can be obtained (204) (e.g., by the processing circuitry 102 of system 101). In some embodiments, the group of defect candidates can be selected from the large number of candidates of the defect map as the ones having higher probability of being DOIs.

The selection can be performed in various ways. By way of example, the group of defect candidates can be selected using a defect classifier or a nuisance filter based on the inspection attributes of the defect candidates. For instance, the defect classifier can provide a probability score for each defect candidate indicating the probability of the candidate being a DOI, and classify the defect candidate into DOI or nuisance according to the probability score thereof. The group of defect candidates can be selected based on the probability scores and/or the classification thereof. In some cases, the probability score of a given defect candidate as provided in such a process can be added as one of the inspection attributes characterizing the given defect candidate.

In some embodiments, the selection of the group of defect candidates can be regarded as a pre-processing step that is performed prior to the presently disclosed defect offset correction process. This pre-processing can reduce the number of the potential defect candidates from the defect map to a lower magnitude, thus enabling the proposed defect offset correction process to work on a smaller group of candidates that have higher probabilities of being DOIs. In some embodiments, the functionality of the selection of the group of defect candidates can be integrated as part of the inspection tool 120, or alternatively, it can be regarded as part of system 101.

As described above, the group of defect candidates as selected are associated with respective inspection locations represented in the inspection coordinate system of the inspection tool.

In order to automatically identify the anchoring defects (i.e., defects that are qualified for purpose of defect offset correction/alignment) from the group of defect candidates (rather than going through the repeated trial and error of defect selection as described above), the present disclosure proposes to use (206) a trained machine learning (ML) model (e.g., the ML module 106) to provide, for each defect candidate in the group, a probability of the defect candidate being a defect of interest (DOI), and rank the group of defect candidates to an ordered list of defect candidates according to respective probabilities thereof.

The ordered list of defect candidates can be sent from system 101 to a review tool (e.g., the review tool 121) to be reviewed for purpose of efficiently identifying sufficient anchoring defects. The defects that are qualified as anchoring defects should be true defects (i.e., DOIs) such that they are captured during both inspection and review. In addition, in some cases, the anchoring defects may have a high level of relevancy/suitability to be used for offset correction, in terms of, e.g., geometrical properties thereof, as will be described below.

A sufficient number of anchoring defects need to be identified for aligning multiple degrees of freedom of transformation between the inspection coordinate system and the review coordinate system. In some cases, the number of anchoring defects that are needed can be predefined (also referred to as a predefined number of DOIs or a target number of DOIs) based on the number of degrees of freedom of transformation between the two coordinate systems.

Accordingly, at least a part of the ordered list of defect candidates can be reviewed (208) by the review tool 121 in accordance with the order of candidates in the list, so as to identify the predefined number of DOIs associated with respective review locations represented in a review coordinate system. Reviewing the defect candidates according to the order (which is ranked based on their probabilities of being DOIs) can enable the review tool to sample a relatively small number of defect candidates and efficiently locate the required predefined number of anchoring defects, as compared to traversing and verifying each defect candidate in a non-ordered manner (e.g., randomly).

As described above, the ML model described with reference to block 206 is used for ranking the group of defect candidates to an ordered list of defect candidates according to their probabilities of being a DOI, so as to assist the selection of anchoring defects. The ML model has been previously trained during a training phase. FIG. 3 illustrates a generalized flowchart of training the ML model in accordance with certain embodiments of the presently disclosed subject matter.

A training set of defect candidates can be obtained (302) (e.g., by the training module 104 in processing circuitry 102).

According to certain embodiments, the training set of defect candidates can be derived from inspecting one or more semiconductor specimens which share the same design as the specimens to be examined in runtime. In some cases, the set of defect candidates may refer to the entire population of defect candidates as revealed during inspection, while in some other cases, the training set may refer to a selected set of defect candidates which is selected by processing the entire population of defect candidates using a defect classifier or a nuisance filter.

Each defect candidate in the training set can be characterized by one or more inspection attributes. The inspection attributes can be obtained during the inspection process by the inspection tool, e.g., based on certain characteristics of the inspection image(s) and/or the defect map(s). By way of example, during inspection, an inspection tool can capture inspection images of a specimen (e.g., a wafer, a die, or part thereof). The captured images of the specimen can be processed using various defect detection algorithms to generate a defect map indicative of defect candidate distribution on the specimen. The generated defect map can be informative of inspection attributes such as, e.g., locations, strength, size, volume, grade, and polarity, etc. of the defect candidates. Optionally, in some cases, additional attributes can be also collected, including image characteristics corresponding to the defect candidates such as, e.g., gray level intensities, contrast, etc., as well as acquisition information, such as acquisition time, acquisition tool ID, region ID, wafer ID, etc. As described above, in cases where a defect classifier or a nuisance filter was previously used to classify/filter the defect candidates, a probability score of each defect candidate being a DOI can be added to the training set as an additional inspection attribute.

Each defect candidate is associated with its respective ground truth (GT) label indicative of the defect candidate being a DOI or nuisance. The GT label can be obtained in various ways, such as, e.g., via manual annotation, from a review tool, etc. By way of example, a review tool can be used to capture review images with higher resolution at locations of the defect candidates, and review the review images for ascertaining whether a defect candidate is a DOI or nuisance. The output of the review tool includes defect classes/types respectively associated with the defect candidates. The defect classes/types of the candidates provided by the review tool can be regarded as ground truth labels of these candidates.

The training set of defect candidates can be represented in different types of data representations. By way of example, the training set of defect candidates, as well as the inspection attributes associated therewith, can be represented in a tabular form, as exemplified with reference to FIG. 5.

Figure 5:
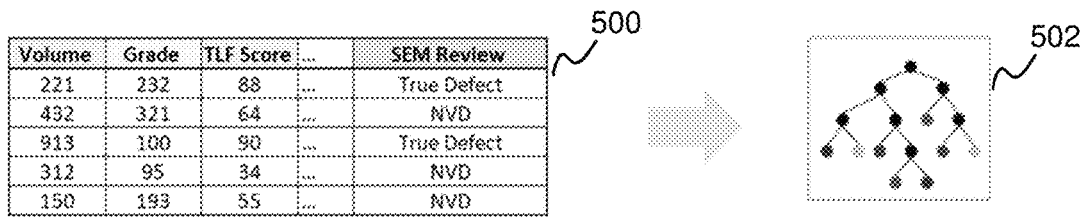
FIG. 5 shows a schematic illustration of an example of a training set in accordance with certain embodiments of the presently disclosed subject matter.

FIG. 5 shows a schematic illustration of an example of a training set in accordance with certain embodiments of the presently disclosed subject matter.

The training set 500 is exemplified as a tabular dataset. The training set 500 comprises N defect candidates stored in a table, where each row represents a specific defect candidate in the set of defect candidates, and each column represents an inspection attribute of the defect candidate.

The inspection attributes obtained during defect inspection can include locations, strength, size, volume, grade, polarity, etc. of the defect candidates. In the present example, a probability score of each defect candidate being a DOI is added as an additional inspection attribute (denoted as "TLF score" in the training set 500). The probability score can be previously derived by a defect classifier or a nuisance filter used for classifying/filtering the defect candidates.

In addition to the inspection attributes, the training set also includes a column representative of the GT labels of the defect candidates. In the present example, the set of defect candidates can be reviewed by a review tool, such as a SEM. As illustrated, the training set 500 includes a column named "SEM review" indicative of the ground truth labels of the candidates as provided by the SEM (where "true defect" represents a DOI while "NVD" represents a nuisance).

The inspection attributes derived from one or more specimens and the GT labels of the defect candidates constitute the training set 500. The training set 500 can be used to train a ML model 502, as will be detailed below.

It is to be noted that although the training set 500 as illustrated in FIG. 5 is demonstrated in the format of a table, this is for exemplary purposes only, and should not be regarded as limiting the present disclosure. Any other suitable representation of such a dataset, including defect candidates and the attributes thereof, can be used in lieu of the tabular format. For instance, in some cases, any of the following table-like structures can be used instead of the tabular format, when appropriate: lists, graphs, matrices, or general binary relations, etc. In some other cases, the training set of defect candidates can be represented in other types of data representations, such as an image dataset, e.g., image patches extracted from the inspection images.

For instance, for each defect candidate detected from an inspection image of the specimen, an inspection patch comprising the defect candidate can be extracted from the inspection image. The inspection patch can be cropped from the inspection image according to a bounding box placed around the candidate. The inspection patch can be cropped at various sizes, such as, e.g., 32×32 pixels, 64×64 pixels, or any other suitable sizes/dimensions. In such cases, the training set can comprise a set of inspection patches corresponding to a set of defect candidates detected from the specimen. It is also possible that the training set can comprise an inspection image of the training specimen where each defect candidate is marked at its respective location.

Referring back to FIG. 3, upon obtaining the training set, the ML model can be trained as follows: for each given defect candidate in the training set, processing (304) the given defect candidate by the ML model, to obtain a predicted class thereof, and optimizing (306) the ML model using a loss function based on the predicted class and the GT label associated with the given defect candidate.

In particular, the ML model is designed and used for the specific purposes of ranking the group of defect candidates into such an order that the review tool, when reviewing the defect candidates according to the order, can identify a sufficient number of DOIs as efficiently/quickly as possible. By way of example, assuming the group of defect candidates consist of N candidates, among which M DOIs should be selected as anchoring defects, the ML model should be able to rank the N candidates to an order of 1-N, such that when the review tool reviews the candidates sequentially according to the order (e.g., starting from the candidate ranked as No. 1 in the order), it can sample fewer candidates and identify M DOIs as quickly as possible (i.e., with minimum trial and error).

That is to say, the proposed ML based defect selection system focuses on selection purity, i.e., the percentage of the number of actual DOIs within the number of defect candidates identified by the ML model as DOIs. In other words, the defect candidates that the ML model ranked with relatively high orders/probabilities to be DOIs should be as "pure" as possible of actually being DOIs, such that the M DOIs can be identified within fewer trials/sampling (e.g., the number of trials may be slightly larger than M but significantly smaller than N). In such cases, the defect candidates ranked with relatively low probabilities of being DOIs are less of concern regarding whether they are correctly ranked (e.g., whether there may be some candidates that are actually DOIs but are somehow mistakenly ranked with lower orders), as the model is not intended to catch all DOIs, thus having a higher capture rate.

Therefore, the proposed ML model aims to achieve relatively high selection purity, which is different from a regular defect classifier or nuisance filter that typically aims to improve capture rate or false alarm rate. In other words, the regular defect classifier attempts to capture as many DOIs as possible, so as not to miss any true defects, thus affecting yield, whereas the proposed ML model serves for a different purpose (i.e., anchoring defect selection). The ML model is thus driven by a different motive, i.e., to improve the purity of the high-ranking candidates so as to sample fewer candidates and identify, as efficiently as possible, the needed number of DOIs.

Such a difference may necessarily influence the specific training process of the ML model. Various configurations of the training process of the ML model can be done to improve selection purity. By way of example, the loss function used for optimizing the ML model can be configured based on selection purity. Specifically, for instance, the ML model can be tailored to prioritize purity by adjusting the loss function (which is configured for binary classification). This may be achieved by amplifying the impact of misclassified negative training samples (i.e., the training samples whose GT labels are nuisances) within the loss function. Consequently, a greater penalty can be imposed when negative samples are incorrectly classified as positive, e.g., by adjusting the weights of such negative samples in the loss function. This approach can ensure that the model is more conservative and asserts a positive prediction only with high confidence, thereby enhancing the purity.

Additionally, or alternatively to the configuration of the loss function, the training set can be specifically selected with respect to selection purity as well. By way of example, when labeling the defect candidates in the training set, it can be decided that only defect candidates that are DOIs and have a high level of relevancy (e.g., suitability/appropriateness) to be used for offset correction are labeled as DOIs. By way of example, a defect candidate can be considered as relevant/suitable for offset correction in terms of its geometrical properties, such as sizes and dimensions. For instance, the size of a suitable defect should not be too large. A certain dimension of the defect, such as length or width, should not be too long. This is because a large defect may occupy or exceed the FOV, making it difficult to measure the offset. In some cases, defect candidates in the training set which are DOIs can be further filtered based on its geometrical properties. For instance, the defect candidates whose size/dimension is within in a predetermined range can be selected. In addition, the defect candidates in the training set should also be rich in its variety. Different types/classes of DOIs should be included in the training set such that the ML model can learn to adapt to different types of defects.

Figure 7:
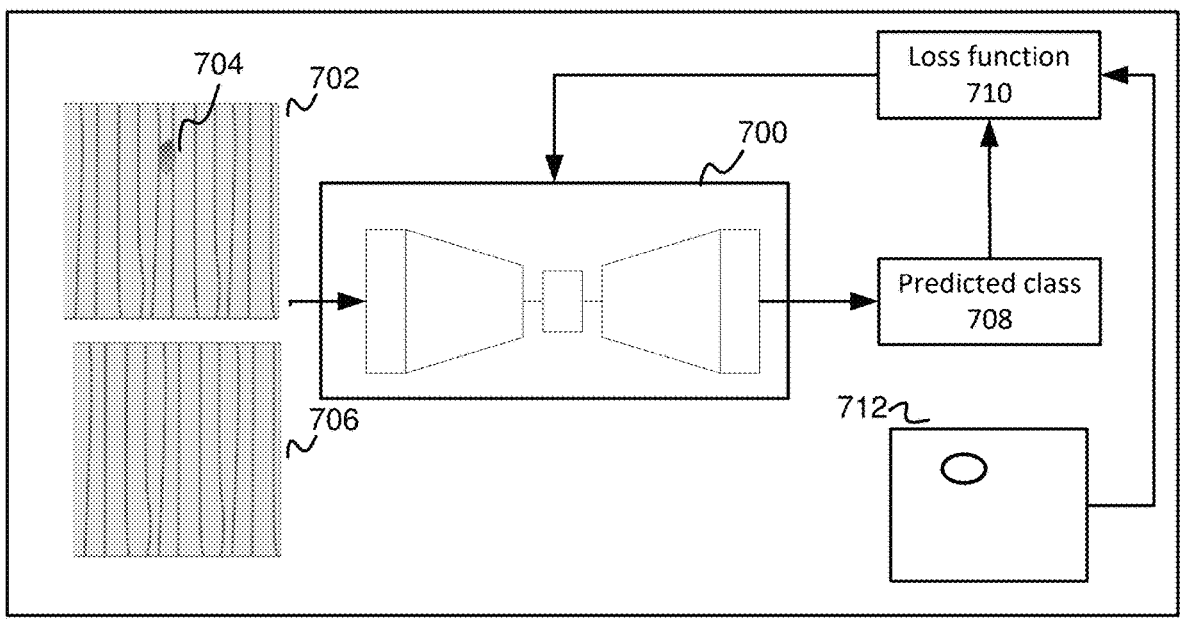
FIG. 7 shows a schematic illustration of a training process of the ML model in accordance with certain embodiments of the presently disclosed subject matter.

FIG. 7 shows a schematic illustration of a training process of the ML model in accordance with certain embodiments of the presently disclosed subject matter.

An ML model 700 is exemplified in FIG. 7. The ML model 700 can be implemented in various types and architectures, such as, e.g., decision trees (such as a random forest), regression models (such as a logistic regression model), and neural networks (such as CNNs), etc. For training the ML model, a training set of defect candidates is obtained. As described above, the training set can be represented in different types of data representations, such as, e.g., a tabular dataset as exemplified in FIG. 5, and an image dataset, etc.

In cases where the training set is an image dataset, it can include one or more training inspection patches that each contains a defect candidate labelled as a DOI, such as, e.g., the training patch 702 containing a DOI 704. The training set also includes one or more training inspection patches that each contains a defect candidate labelled as a nuisance or false alarm, such as, e.g., the training patch 706 (where no DOI is marked).

The training set (e.g., either the tabular dataset or the image dataset) can be fed into a ML model 700 to be processed. The specific type of ML model to be implemented can be related to the type of input data. By way of example, in cases where the training set is a tabular dataset, such as the training set 500 as exemplified in FIG. 5, the ML model can be implemented as a decision tree, such as a random forest 502. In cases where the training set is an image dataset, the ML model 700 can be implemented as a neural network, such as a DNN (e.g., CNN).

By way of example, the DNN can inherently extract representative features/attributes of the training inspection patches and classify the image patches based on the extracted features/attributes. Taking CNN as an exemplified implementation of the ML model, during the forward pass, convolutional operations are performed on each training patch, so as to learn to capture representative features. For each specific layer in the CNN, output feature maps can be generated, e.g., by convolving each filter of the specific layer across the width and height of the input feature maps, and producing a two-dimensional activation map which gives the responses of that filter at every spatial position. Stacking the activation maps for all filters along the depth dimension forms a full output feature map of the specific layer, representative of extracted features/attributes of a given input training patch. After feature extraction through convolutional layers, additional layers such as fully connected layers and an output layer can convert the output feature maps into probability scores for each class, and the class with the highest probability is selected as the predicted class for a given training inspection patch.

The ML model can thus provide a predicted class 708 (in some cases the predicted class can be associated with a predicted probability of the candidate belonging to the predicted class) based on it. The predicted class 708 can be evaluated with respect to the ground truth label 712 of DOI 704, using a loss function 710 (e.g., a classification loss, such as, e.g., Cross Entropy, or Squared Hinge, etc.). As described above, in some cases, the loss function can be specifically configured in an attempt to improve selection purity. The parameters of the ML model can be optimized to reduce/minimize the difference between the predicted class 708 and the ground truth label 712.

Upon being trained, the ML model 700 can be deployed in runtime and used to rank a group of defect candidates to an ordered list, where each defect candidate is associated with a ranking in the order according to the probability/likelihood of the defect candidate being a defect of interest (DOI), as described in detail with reference to FIG. 2. For instance, if a group has N defect candidates, after being processed by the trained decision model, the N defect candidates will be respectively ranked from 1 to N, where each candidate has its unique ranking in the order.

Figure 6:
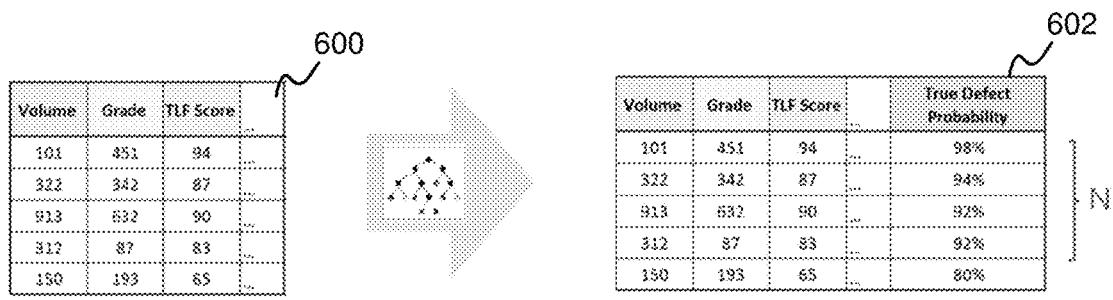
FIG. 6 shows a schematic illustration of a runtime employment of the ML model in accordance with certain embodiments of the presently disclosed subject matter.

FIG. 6 shows a schematic illustration of a runtime employment of the ML model in accordance with certain embodiments of the presently disclosed subject matter.

During runtime examination, a group of defect candidates results from examination of one or more specimens by an inspection tool. The group of defect candidates comprising N defect candidates is stored in a table 600, where each row represents a specific defect candidate in the group of defect candidates, and each column represents an inspection attribute of the defect candidates. The group of defect candidates can be processed by a trained ML model, which provides an order list of the defect candidates in the group, as illustrated in table 602.

As shown, table 602 has added a new column "True defect probability" as compared to table 600, where each of the N defect candidates is associated with its probability of the defect candidate being a DOI. The defect candidates are thus sorted into a total order of 1-N. The N defect candidates are sorted in accordance with a descending order of the column "True defect probability", such that the defect candidates having the highest likelihood of being DOIs are listed at the top. For instance, the defect candidate with a probability of 98% is ranked first, indicating this candidate, among all the candidates, is most likely to be a DOI.

Figure 9:
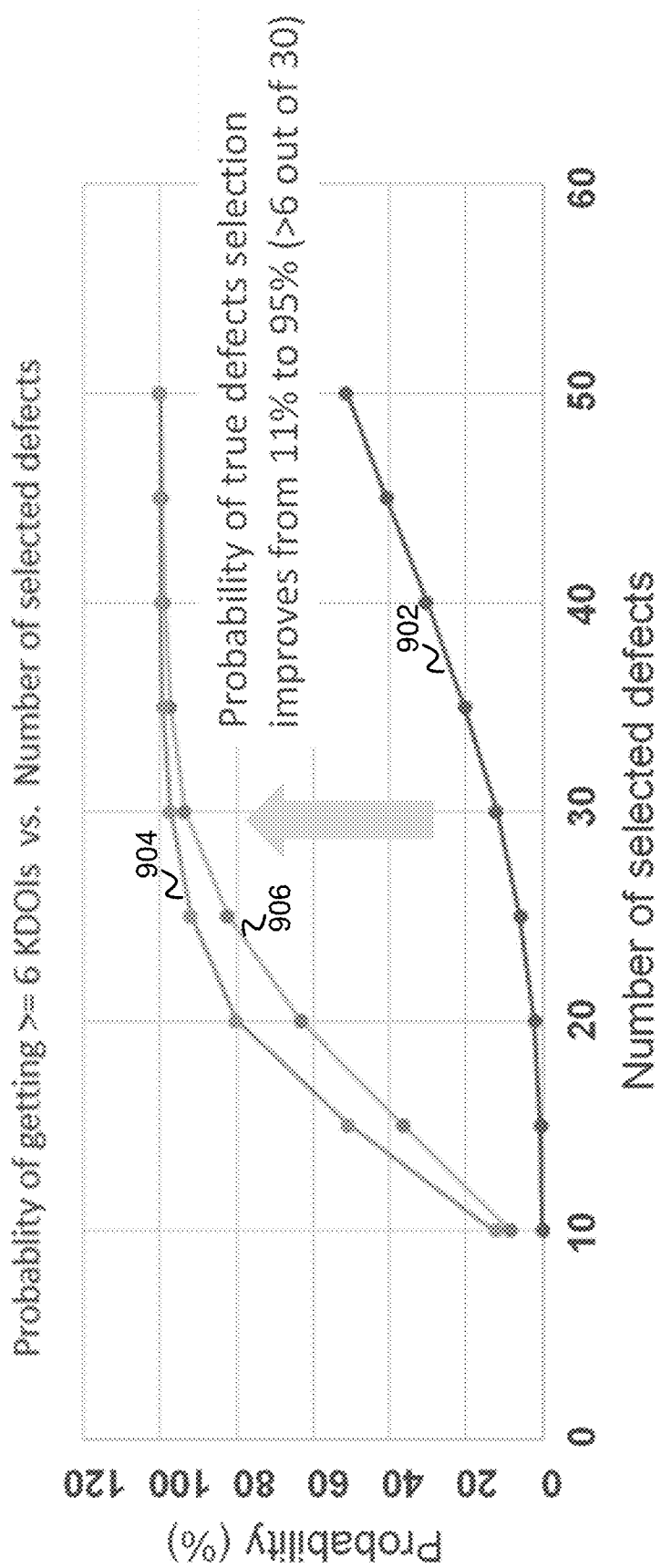
FIG. 9 illustrates a diagram demonstrating improvement of selection efficiency of anchoring defects in accordance with certain embodiments of the presently disclosed subject matter.

Continuing with the description of FIG. 2, as described above, at least a part of the ordered list of defect candidates can be reviewed by the review tool in accordance with the order of candidates in the list. Reviewing the defect candidates according to the order (which is ranked based on their probabilities of being DOIs) can enable the review tool to efficiently locate the required predefined number of anchoring defects, as compared to traversing and verifying each defect candidate in a non-ordered manner (e.g., randomly). FIG. 9 illustrates a diagram demonstrating improvement of selection efficiency of anchoring defects in accordance with certain embodiments of the presently disclosed subject matter.

The graphs in FIG. 9 are presented with an X axis representing the number of traversed/sampled defect candidates and a Y axis representing the probability of selecting a predetermined number of DOIs (assuming the target number of DOIs in the present example is six). Graph 902 demonstrates a selection scenario where the review tool traverses/samples the defect candidates in the group randomly, without using the presently proposed ML based defect selection system. As shown, 50 defect candidates need to be reviewed by the review tool in order to reach a less than 60% of probability of locating six DOIs. In comparison, when using a ML model specifically configured to assist defect selection as described above, the number of defect candidates to be sampled is significantly reduced while reaching a much higher probability of locating the target number of DOIs.

By way of example, graph 904 demonstrates a selection scenario where a ML model implemented as a random forest is used for ranking the group of defect candidates into an order, in which case the review tool only needs to sample 20-30 defect candidates according to the order, and already manages to reach a relatively high probability (between 80%-100%) of locating the target number of DOIs. Similarly, graph 906 demonstrates a selection scenario where the ML model is implemented as a different type of model, e.g., a logistic regression model, and the selection efficiency has been notably improved in a similar manner. Therefore, the proposed ML based correction enables to only sample a smaller number of defect candidates for efficiently locating the target number of anchoring defects for alignment.

In particular, when looking at a sampling of 30 defect candidates on the X axis, the probability of locating the target number of DOIs increases from about 11% without using the proposed solution, to about 95% when using the proposed ML based solution.

Referring back to FIG. 2, once the review tool identifies the predefined number of DOIs which are associated with respective review locations represented in a review coordinate system, the predefined number of DOIs as identified from the part of the ordered list and their review locations can be sent back to system 101. Upon receiving, from the review tool, the predefined number of DOIs associated with their respective review locations, an offset between the review coordinate system and the inspection coordinate system can be calculated (210) (e.g., by the offset calculation module 108) based on respective inspection and review locations associated with the predefined number of DOIs. The calculated offset is usable by the review tool to review at least part of the group of defect candidates which is not yet reviewed.

The predefined number of DOIs as selected are now associated with both their inspection locations in the inspection coordinate system of the inspection tool (from the defect map), and their review locations in the review coordinate system of the review tool. These DOIs can be used as anchoring defects for aligning the two coordinate systems.

Figure 8:
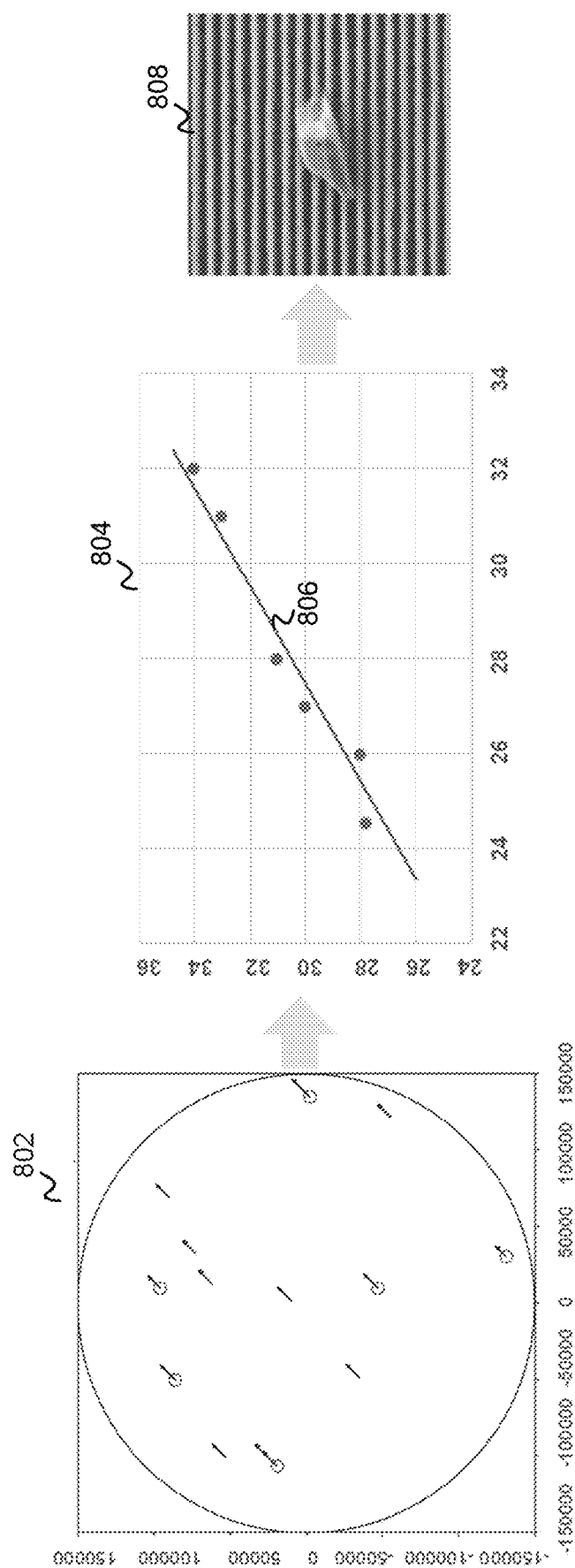
FIG. 8 shows a schematic illustration of an offset calculation in accordance with certain embodiments of the presently disclosed subject matter.

FIG. 8 shows a schematic illustration of an offset calculation in accordance with certain embodiments of the presently disclosed subject matter.

A specimen map 802 (e.g., a wafer map) is exemplified, where n anchoring defects as identified are marked therein (denoted by circles, where n=6 in the present example). Each anchoring defect is associated with both its inspection location and review location. The discrepancy between the two locations is marked as a vector for each defect.

The offset between the two coordinate systems can be calculated based on the inspection and review locations of the n anchoring defects. By way of example, the offset can be derived by performing a linear regression using the two sets of locations. Linear regression can be used to fit a predictive model to an observed data set of values of two variables, such as the inspection and review locations of the anchoring defects. Once developing such a model, when additional values of one variable (such as new defects having only inspection locations) is collected, the fitted model can be used to make a prediction of the values of the other variable (such as the review locations of the new defects).

Graph 804 illustrates an example of a linear relationship 806 between the variable of X-axis which represents the review locations of the defects, and the variable of Y-axis which represents the inspection locations of the defects. The linear relationship can be derived based on a linear regression model. The model can estimate the slope and intercept of the line of best fit, which represents the linear relationship 806 between the two variables. The slope represents the change in the Y-axis variable for each unit change in the X-axis variable, while the intercept represents the predicted value of the Y-axis variable when the X-axis variable is zero.

As described above, the mismatch between the two coordinate systems can be reflected in one or more degrees of freedom of transformation between the two systems. Therefore, the offset between the two coordinate systems can be represented by a transformation matrix comprising a plurality of transformation coefficients corresponding to the plurality of degrees of freedom of transformation between the inspection coordinate system and the review coordinate system. By way of example, the plurality of transformation coefficients can comprise two or more of the following: X offset, Y offset, rotation, perpendicularity, X scaling, Y scaling, X parabolic, and Y parabolic (where X parabolic and Y parabolic represent higher order correction (square terms)).

By way of example, the transformation matrix can be represented in the following formula:

$$\begin{bmatrix} X' \\ Y' \end{bmatrix} = \begin{bmatrix} a0 & a1 & a2 & 0 & a3 \\ b0 & b1 & b2 & b3 & 0 \end{bmatrix} * \begin{bmatrix} X \\ Y \\ 1 \\ X^2 \\ Y^2 \end{bmatrix}$$

where X and Y represent the inspection coordinates of a given defect, a0, b0, a1, b1, a2, b2, a3 and b3 represent the transformation coefficients corresponding to the plurality of degrees of freedom of transformation between the two coordinate systems, and X' and Y' represent the coordinates after correction, i.e., the expected review coordinates of the defects.

It is to be noted that the a~f, as well as the specific examples of the transformation coefficients such as X offset, Y offset, rotation, etc., are listed for exemplary purposes only. Different transformation coefficients can be used in addition to or in lieu of the above.

Once the offset (in the form of a transformation matrix) is obtained, it can be used to correct locations of the defect candidates in the group that are not yet reviewed by the review tool, such that the review tool can review the unreviewed defect candidates at the corrected locations.

It is to be noted that in some cases, the predefined number of DOIs that needs to be selected from the group of defect candidates is associated with the number of transformation coefficients in the transformation matrix, which corresponds to the number of degrees of freedom of transformation between the inspection coordinate system and the review coordinate system. By way of example, in cases where there are eight degrees of freedom of transformation between the two coordinate systems (e.g., including X offset, Y offset, rotation, perpendicularity, X scaling, Y scaling, X parabolic, and Y parabolic, as listed above), eight transformation coefficients are included in the transformation matrix, and at least eight DOIs need to be selected from the group of defect candidates in order to derive the transformation matrix, e.g., based on linear regression.

Continuing with the example 408 in FIG. 4, when a review tool navigates according to an inspection location of a defect candidate, i.e., centering the FOV by the inspection location, the actual location of the defect deviates from the center of FOV with an offset. By applying the calculated offset (represented by the transformation matrix) to the inspection location, a corrected location can be calculated, and the review tool, when centering the FOV around the corrected location, can find the defect in the center of the FOV, as illustrated in 808 of FIG. 8.

Similarly, for at least a part of the group of defect candidates which is not yet reviewed, review locations of such defect candidates can be obtained using the offset. The at least part of the group of defect candidates can be reviewed by the review tool at the review locations.

Throughput (TpT) of the reviewing process for reviewing the at least part of the unreviewed defect candidates by the review tool can be significantly improved by using the offset calculated using the above-described offset correction system. Specifically, in comparison with previous cases where defect offset correction was not performed, thus requiring the review tool to capture a relatively large FOV to ensure the shifted defect will be captured, the presently proposed solution can enable the review tool to capture a smaller FOV during review, thus reducing the image grab time and improving system TpT. In comparison with previous cases where defect offset correction is applied by sampling the defect candidates randomly to identify a sufficient number of anchoring defects, the presently proposed solution enables to sample less defect candidates while locating the required number of defects quickly and efficiently, thus saving system overhead for the repetitive trial and error process for searching for anchoring defects.

FIG. 10 illustrates an example of TpT improvement for examining a specimen in accordance with certain embodiments of the presently disclosed subject matter.

The specific semiconductor specimen under examination has four layers. Table 1000 illustrates a TpT breakdown to four factors including motion, image grab time, auto-focus (AF), and automatic defect recognition (ADR). As shown, after using the proposed defect offset correction, image grab time has been significantly improved for all the layers (in particular, there is a 47% improvement for the grab time of layer 1). As described above, using the proposed offset correction enables the review tool to capture a smaller FOV, while the image grab time is typically proportional to the square of the FOV size. For instance, when the FOV size is reduced by 30%, the image scan area by the tool can be reduced by 50%. The improvement of image grab time leads to the overall defect-per-hour (DPH, i.e., the number of defects that can be reviewed within an hour) improvement of 10%~20%.

It is to be noted that examples illustrated in the present disclosure, such as, e.g., the exemplified images and defects, the exemplified ML model, the loss functions, the training datasets, the transformation matrix, etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein, is providing an automatic defect offset correction system capable of correcting defect offsets between two coordinate systems and establishing more accurate locations for all defect candidates in an automated manner, without requiring manual intervention. The proposed system is capable of only sampling a small number of defect candidates for efficiently locating qualified anchoring defects for alignment, without suffering from heavy overhead of repeated trial and error of defect selection, thereby enhancing the review efficiency significantly.

Among further advantages of certain embodiments of the presently disclosed subject matter as described herein, is that compared to other automatic defect offset correction approaches, such as, e.g., reference-based offset correction, the presently proposed solution does not require physical changes to be made to the design or the wafer. It provides a direct measurement of defect offset between two coordinate systems (rather than an indirect measurement via reference coordinate offset), thus improving the level of accuracy of the corrected defect locations.

Among further advantages of certain embodiments of the presently disclosed subject matter as described herein, is that by using the offset calculated using the proposed offset correction system, throughput (TpT) of the reviewing process by the review tool can be significantly improved. Specifically, in comparison with previous cases where defect offset correction was not performed, thus requiring the review tool to capture a relatively large FOV to ensure the shifted defect will be captured, the presently proposed solution can enable the review tool to capture a smaller FOV during review, thus reducing the image grab time and improving system TpT. In comparison with previous cases where defect offset correction is applied by sampling the defect candidates randomly to identify a sufficient number of anchoring defects, the presently proposed solution enables to sample less defect candidates to locate the required number of defects quickly and efficiently, thus saving system overhead for the repetitive trial and error process for searching for anchoring defects.

Among further advantages of certain embodiments of the presently disclosed subject matter as described herein, is that the ML model used herein for ranking the defect candidates and assisting the defect selection is specifically designed to achieve relatively high selection purity, in comparison to a regular defect classifier or nuisance filter, which typically aims to improve capture rate or false alarm rate. In other words, the regular defect classifier attempts to capture as many DOIs as possible, so as not to miss any true defects, thus affecting yield, whereas the proposed ML model serves for a different purpose (i.e., anchoring defect selection). The proposed ML model is thus driven by a different motive, i.e., to improve the purity of the high-ranking candidates so as to sample less defect candidates and identify as quickly as possible the needed number of DOIs.

This can be achieved by various configurations of the training process of the ML model to improve selection purity. By way of example, the loss function used for optimizing the ML model can be configured based on selection purity. Additionally, or alternatively, the training set can be specifically selected with respect to selection purity. The ML model trained as such is capable of sampling a smaller number of defect candidates for locating the target number of anchoring defects for alignment.

It is to be understood that the present disclosure is not limited in its application to the details set forth in the description contained herein or illustrated in the drawings.

In the present detailed description, numerous specific details are set forth in order to provide a thorough understanding of the disclosure. However, it will be understood by those skilled in the art that the presently disclosed subject matter may be practiced without these specific details. In other instances, well-known methods, procedures, components, and circuits have not been described in detail so as not to obscure the presently disclosed subject matter.

Unless specifically stated otherwise, as apparent from the present discussions, it is appreciated that throughout the specification discussions utilizing terms such as "obtaining", "examining", "inspecting", "processing", "using", "providing", "performing", "applying", "correcting", "ranking", "calculating", "reviewing", "training", "optimizing", "enabling", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the defect offset correction system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review, and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying, and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination", or its derivatives used in this specification, is not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology", or derivatives thereof used in this specification, is not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a DOI candidate, upon being reviewed/tested, may actually be a DOI, or, in some other cases, it may be nuisances, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the present detailed description, numerous specific details are set forth in order to provide a thorough understanding of the methods and apparatus.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of examining a semiconductor specimen, the system comprising a processing circuitry configured to:
obtain a group of defect candidates from a defect map resulting from inspecting the semiconductor specimen by an inspection tool, the group of defect candidates associated with respective inspection locations represented in an inspection coordinate system;
use a trained machine learning (ML) model to provide, for each defect candidate in the group, a probability of the defect candidate being a defect of interest (DOI), and rank the group of defect candidates to an ordered list of defect candidates according to respective probabilities thereof;
in response to a part of the ordered list of defect candidates being reviewed by a review tool in accordance with an order thereof, receive, from the review tool, a predefined number of DOIs identified from the part of the ordered list and associated with respective review locations represented in a review coordinate system; and
calculate an offset between the review coordinate system and the inspection coordinate system based on respective inspection and review locations associated with the predefined number of DOIs, wherein the offset is usable by the review tool to review at least part of the group of defect candidates which is not yet reviewed.

2. The computerized system according to claim 1, wherein the ML model is previously trained using a training set of defect candidates, each defect candidate characterized by one or more inspection attributes and associated with a respective ground truth (GT) label indicative of the defect candidate being a DOI or nuisance.

3. The computerized system according to claim 2, wherein the one or more inspection attributes characterizing each defect candidate comprise at least one of: grade, volume, polarity, strength, size, and probability of the defect candidate being a DOI.

4. The computerized system according to claim 2, wherein the training of the ML model comprises: for each given defect candidate in the training set, processing the given defect candidate by the ML model, to obtain a predicted class thereof, and optimizing the ML model using a loss function based on the predicted class and the GT label associated with the given defect candidate.

5. The computerized system according to claim 4, wherein the loss function is configured based on a selection purity representative of a percentage of a number of actual DOIs within a number of defect candidates identified as DOIs.

6. The computerized system according to claim 2, wherein only defect candidates in the training set that are DOIs and have a relatively high level of relevance to be used for offset correction are labeled as DOIs.

7. The computerized system according to claim 1, wherein the offset is represented by a transformation matrix comprising a plurality of transformation coefficients corresponding to a plurality of degrees of freedom of transformation between the inspection coordinate system and the review coordinate system.

8. The computerized system according to claim 7, wherein the plurality of transformation coefficients comprises two or more of: X offset, Y offset, rotation, perpendicularity, X scaling, and Y scaling, x parabolic, and y parabolic.

9. The computerized system according to claim 7, wherein the predefined number of DOIs as selected is associated with a number of transformation coefficients in the transformation matrix.

10. The computerized system according to claim 1, wherein the offset is calculated by performing linear regression based on the respective inspection and review locations associated with the predefined number of DOIs.

11. The computerized system according to claim 1, wherein the processing circuitry is further configured to obtain review locations for the at least part of the group of defect candidates which is not yet reviewed using the offset, thereby enabling the review tool to review the at least part of the group of defect candidates at the review locations.

12. The computerized system according to claim 1, wherein the reviewing of the at least part of the group of defect candidates which is not yet reviewed using the offset enables to improve throughput (TpT) of the review tool.

13. The computerized system according to claim 1, wherein the ML model is one of a random forest, a logistic regression model, or a neural network.

14. A computerized method of examining a semiconductor specimen, the method comprising:
obtaining a group of defect candidates from a defect map resulting from inspecting the semiconductor specimen by an inspection tool, the group of defect candidates associated with respective inspection locations represented in an inspection coordinate system;
using a trained machine learning (ML) model to provide, for each defect candidate in the group, a probability of the defect candidate being a defect of interest (DOI), and ranking the group of defect candidates to an ordered list of defect candidates according to respective probabilities thereof;
in response to a part of the ordered list of defect candidates being reviewed by a review tool in accordance with an order thereof, receiving, from the review tool, a predefined number of DOIs identified from the part of the ordered list and associated with respective review locations represented in a review coordinate system; and
calculating an offset between the review coordinate system and the inspection coordinate system based on respective inspection and review locations associated with the predefined number of DOIs, wherein the offset is usable by the review tool to review at least part of the group of defect candidates which is not yet reviewed.

15. The computerized method according to claim 14, wherein the ML model is previously trained using a training set of defect candidates, each defect candidate characterized by one or more inspection attributes and associated with a respective ground truth (GT) label indicative of the defect candidate being a DOI or nuisance.

16. The computerized method according to claim 15, wherein the training of the ML model comprises: for each given defect candidate in the training set, processing the given defect candidate by the ML model, to obtain a predicted class thereof, and optimizing the ML model using a loss function based on the predicted class and the GT label associated with the given defect candidate.

17. The computerized method according to claim 16, wherein the loss function is configured based on a selection purity representative of a percentage of a number of actual DOIs within a number of defect candidates identified as DOIs.

18. The computerized method according to claim 14, wherein the offset is represented by a transformation matrix comprising a plurality of transformation coefficients corresponding to a plurality of degrees of freedom of transformation between the inspection coordinate method and the review coordinate method.

19. The computerized method according to claim 14, wherein the reviewing of the at least part of the group of defect candidates which is not yet reviewed using the offset enables to improve throughput (TpT) of the review tool.

20. A non-transitory computer readable storage medium tangibly embodying a program of instructions that, when executed by a computer, cause the computer to perform a method of examining a semiconductor specimen, the method comprising:
obtaining a group of defect candidates from a defect map resulting from inspecting the semiconductor specimen by an inspection tool, the group of defect candidates associated with respective inspection locations represented in an inspection coordinate system;
using a trained machine learning (ML) model to provide, for each defect candidate in the group, a probability of the defect candidate being a defect of interest (DOI), and ranking the group of defect candidates to an ordered list of defect candidates according to respective probabilities thereof, in response to a part of the ordered list of defect candidates being reviewed by a review tool in accordance with an order thereof, receiving, from the review tool, a predefined number of DOIs identified from the part of the ordered list and associated with respective review locations represented in a review coordinate system; and
calculating an offset between the review coordinate system and the inspection coordinate system based on respective inspection and review locations associated with the predefined number of DOIs, wherein the offset is usable by the review tool to review at least part of the group of defect candidates which is not yet reviewed.

\* \* \* \* \*